United States Patent [19]
Jones et al.

[11] Patent Number: 5,690,548
[45] Date of Patent: Nov. 25, 1997

[54] PELVIC GIRDLE SPLITTER TOOL AND METHOD

[76] Inventors: Kevin L. Jones, 5841 W. Barden Rd., Coleman, Mich. 48618; Jeffery M. Simon, 10799 N. Shepherd Rd., Clare, Mich. 48617

[21] Appl. No.: 692,601

[22] Filed: Aug. 6, 1996

[51] Int. Cl.⁶ .................................................. A22C 17/06
[52] U.S. Cl. ............................................... 452/160; 30/92
[58] Field of Search ......................... 452/160, 16; 30/92, 30/244, 248, 346.61, 351

[56] References Cited

U.S. PATENT DOCUMENTS

| | | | |
|---|---|---|---|
| 1,687,663 | 10/1928 | Goldfinger | 452/160 |
| 2,206,257 | 7/1940 | Kah. | |
| 2,609,565 | 9/1952 | Mostowicz. | |
| 3,583,024 | 6/1971 | Garza. | |
| 3,846,908 | 11/1974 | Allievi. | |
| 4,092,774 | 6/1978 | Watts | 30/92 |
| 4,133,078 | 1/1979 | Cromwell. | |
| 4,461,080 | 7/1984 | Olson. | |
| 4,528,751 | 7/1985 | Bremer et al.. | |
| 4,905,350 | 3/1990 | Gardner | 452/16 |
| 5,288,263 | 2/1994 | Ayala. | |
| 5,320,576 | 6/1994 | Sagen. | |
| 5,453,043 | 9/1995 | Monson | 452/160 |
| 5,462,479 | 10/1995 | Hajek | 452/160 |

FOREIGN PATENT DOCUMENTS 1579646   8/1969   France .................. 452/16

*Primary Examiner*—Willis Little
*Attorney, Agent, or Firm*—Learman & McCulloch

[57] ABSTRACT

The pelvic bone splitter (10) has a shaft (12) with a slot (18) and a knurled surface (26) on its free end (24). A first end (34) of a blade (14) is pivotally retained in the slot (18) by a pivot pin (16). Cutting edges (40, 42 and 44) on the blade (14) are movable into the slot (18). During use, a free end (24) of the shaft (12) is passed under the pelvic girdle (64) and out through an aperture (66) in the hide (68). Pressure is applied to the hand grip (50) to move the cutting edge (42) toward the slot (18), compress the pelvic girdle (64) between the cutting edge (42) and the anvil surfaces (28 and 30) and split the pelvic girdle.

12 Claims, 3 Drawing Sheets

PELVIC GIRDLE SPLITTER TOOL AND METHOD

BACKGROUND OF THE INVENTION

1. Technical Field

This invention relates to a tool and method of use thereof and more particularly to a tool for splitting the pelvic girdle of a game animal without puncturing the bladder, urethra or intestines and use of the tool by hunters.

2. Description of the Prior Art

Game animals such as deer are generally cleaned in the field near where they are felled. Failure to empty the body cavity promptly may result in the meat having a strong gamey taste or smell. During the cleaning process care must be taken not to puncture the bladder urethra or intestines. Contact with urine and feces may spoil the meat for human consumption.

The entire digestive track can be removed without being punctured or severed from the esophagus down by splitting the pelvic girdle. Splitting the pelvic girdle exposes the terminal area of the small intestine and allows removal of the intestines, bladder and urethra without being punctured or severed. Many different tools and methods have been used for splitting pelvic girdles. They include striking the pelvis with an axe and placing a knife against the pelvic girdle and hitting the back edge of the blade with a rock. Both of these procedures can result in personal injury and frequently result in the small intestine, bladder or urethra being punctured.

Saws of various types have been used to cut through pelvic girdles. Saws are safe to use but may puncture parts and contaminate the meat. Saws also tend to be slow and require substantial effort to sever bone. The sharp teeth of saws require shielding to prevent damage to other equipment while being carried by a hunter.

Pelvic splitter tools that rely on impact from an integral sliding weight avoid many of the problems outlined above. Their primary drawback is their weight that generally has to be carried by a hunter. For impact to quickly sever a pelvic girdle, there must be substantial weight to provide the impact.

A knife with a tapered slot has also been used to shear the pelvic girdle of deer. The knife is positioned with the pelvic girdle in the tapered slot and in contact with the upper and lower edges of the slot. The handle of the knife is then rocked back and forth until the bone is sheared. The obvious drawback of a knife with a tapered slot is that the slot must be the proper size. If the pelvis girdle is slightly too large or slightly too small the knife will not work. A hunter would therefore have to determine the size animal that could be killed before starting the hunt or take multiple knives with different slot sizes. While a single knife could handle a range of animal sizes, it is unlikely that it could handle the largest deer as well as a relatively small one or two year old deer.

SUMMARY OF THE INVENTION

An object of the invention is to provide a lightweight tool that can easily and quickly split a pelvic girdle. Another object of the invention is to provide a tool that can be safely carried with minimal effort. A further object to the invention is to provide a tool for splitting a pelvic girdle that is durable and requires minimal maintenance.

The tool for splitting a pelvic girdle includes a shaft and a blade member that are pivotally attached to each other. The shaft is an elongated generally straight member with a slot extending a portion of its length. The surfaces on either side of the slot are anvil surfaces. A gripping surface is provided on a free end of the shaft.

The first end of the blade member is pivotally attached to the shaft in the end of the slot that is furthest from the gripping surface. A handle is on the second end of the blade member. A beveled section of the blade member forms a cutting edge which is received within the slot when the blade member is pivoted toward the shaft to a closed position for storage. The cutting edge of the blade member includes a base cutting edge and a primary cutting edge. The primary cutting edge is substantially shorter than the base cutting edge and is on a portion of the blade member that projects outwardly from a mid portion of the base cutting edge. Both the primary cutting edge and the base cutting edge are in a common plane with the primary cutting edge closer to the pivot connection between the shaft and the blade member then most of the base cutting edge.

The free end of the shaft, with a blade member pivoted to an open position, is inserted from the abdominal cavity under the pelvic girdle and through a hole in the animal's hide near the anus. After the shaft is inserted about as far as it will go, the blade member is pivoted in a close direction toward the shaft. The primary cutting edge contacts the pelvic girdle and the pelvic girdle is squeezed between the primary cutting edge and the two anvil surfaces on the shaft. Substantial mechanical advantage is provided by the length of the shaft and the blade member and the position of the primary cutting edge near the pivot. Manual force on the hand grip and the gripping surface severs the pelvic girdle, allows the rear legs to separate and exposes the terminal area of the small intestine.

DESCRIPTION OF THE DRAWING

The presently preferred embodiment of the invention is disclosed in the following description and in the accompanying drawing, wherein:

FIG. 2 is a side elevational view of the pelvic girdle splitter tool;

DESCRIPTION OF THE PREFERRED EMBODIMENT

Figure 1:
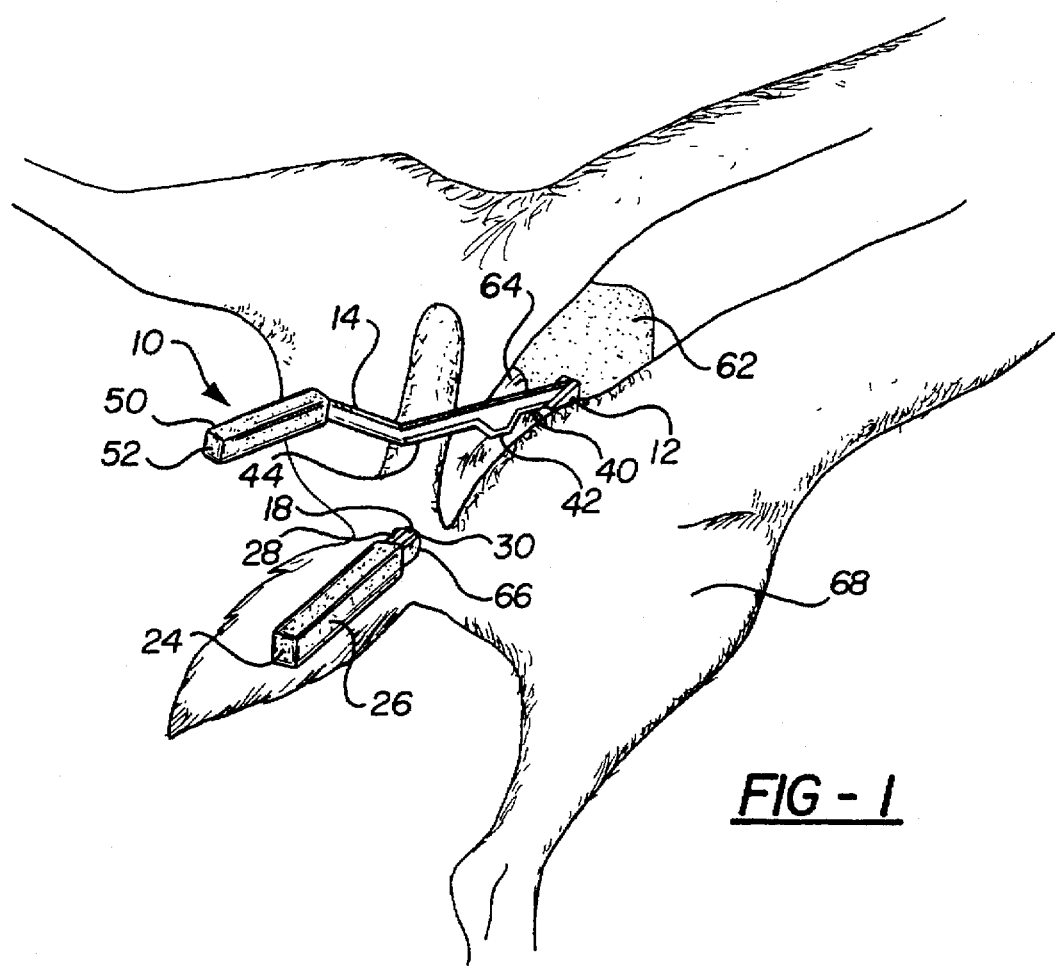
FIG. 1 is a perspective view of an animal carcass and the pelvic girdle splitter tool in position for use.
Figure 3:
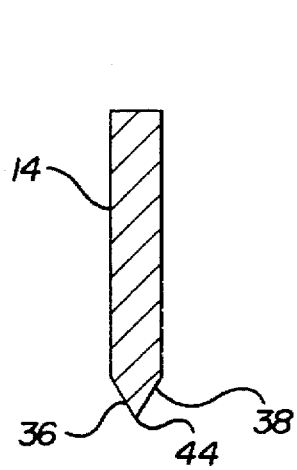
FIG. 3 is an enlarged sectional view taken along line 3—3 in FIG. 2.
Figure 4:
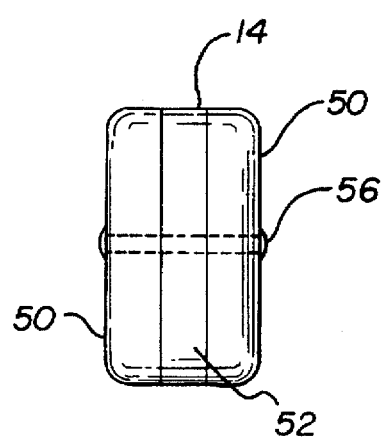
FIG. 4 is an enlarged end view of the blade member handle.

The pelvic girdle splitter 10 includes a shaft 12 and a blade member 14 pivotally connected to the shaft 12 by a pivot pin 16. The shaft 12 has a slot 18 with end surfaces 20 and 22 and a free end 24. A high friction grip surface or a knurled surface 26 can be provided on the free end 24 of the shaft 12. This surface 26 is required so that a hunter can hold the shaft 12 firmly even when it is covered with blood or other fluid. In addition to being able to grasp the free end 24 of the shaft 12, it is necessary to be able to insert the shaft under the pelvic girdle 64 and through an aperture 66 in the hide 68 as shown in FIG. 1. To do this, the shaft 12 and the grip surface 26 should be relative small in diameter.

Figure 5:
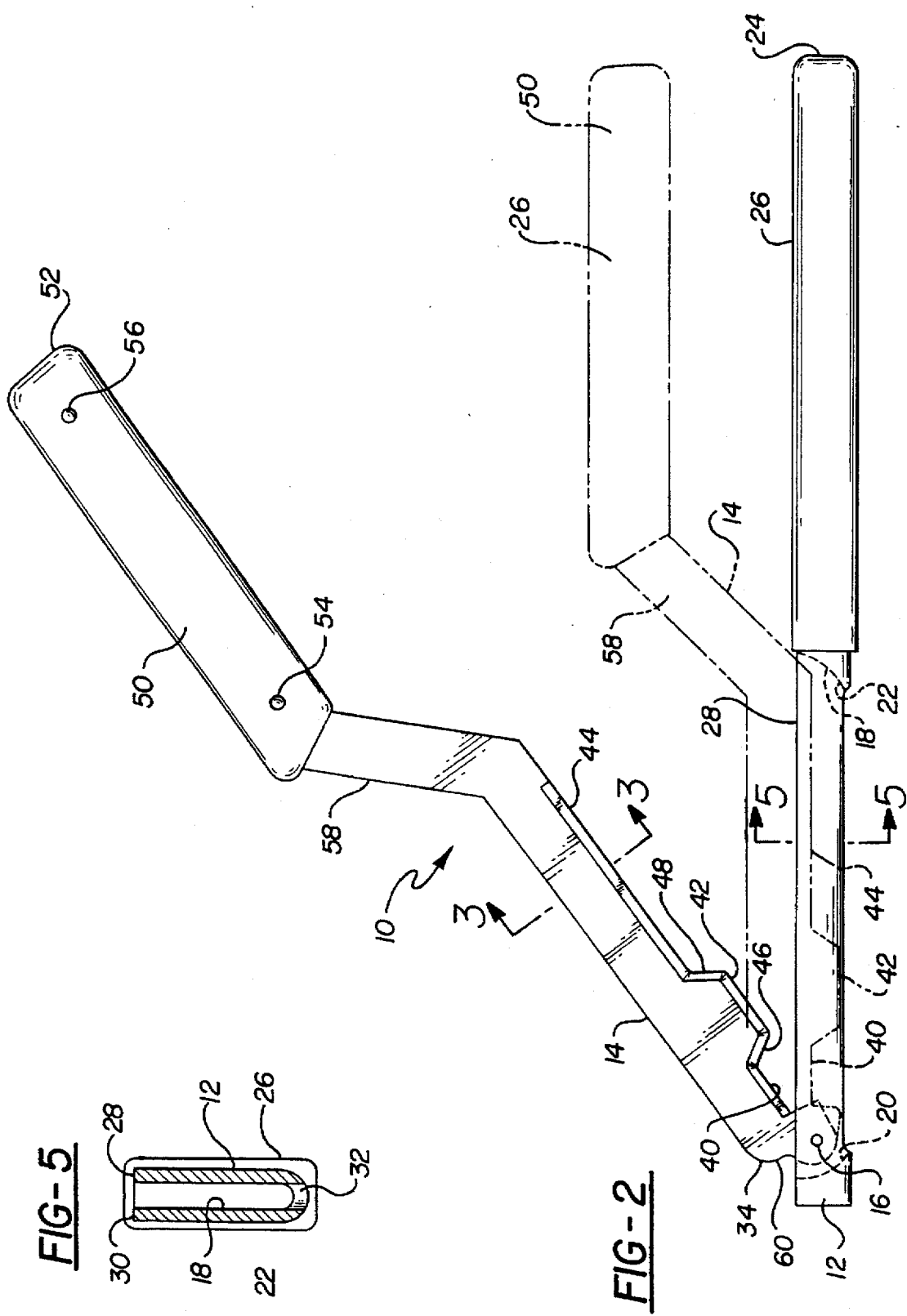
FIG. 5 is an enlarged view taken along line 5—5 in FIG. 2.

The slot 18 preferably passes completely through the shaft 12 to facilitate cleaning. If desired however, the bottom of the slot 18 could be closed. Anvil surfaces 28 and 30 are provided on the shaft 12 on both side of the slot 18 as shown in FIG. 5. The shaft 12 as shown in FIG. 5 is a flat bar bent in a U shape. A portion of the bite of the U shape is machined away to form an aperture 32 which opens the slot 18. Plugs are inserted in the open top of the U shaped member to form the ends 20 and 22 of the slot 18.

The shaft 12 could be fabricated from two flat bars with spacers at both ends of the slot 18 which form the ends 20 and 22 of the slot. Anvil surfaces 28 and 30 are provided on both side of the slot as described above. A high friction grip surface or a knurled surface 26 is provided on the free end 24 of the shaft 12 as explained above.

Figure 6:
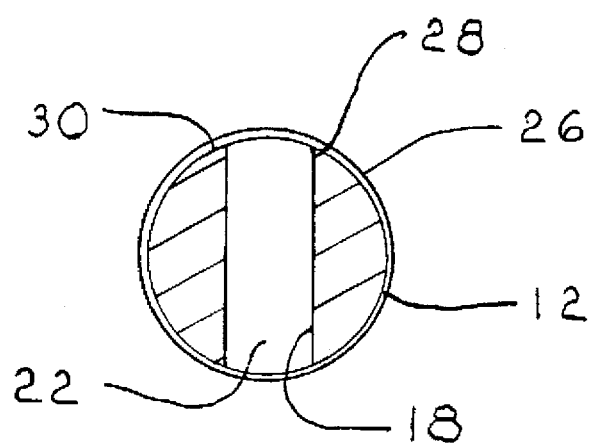
FIG. 6 is an enlarged view taken along line 5—5 in FIG. 2 showing a one piece shaft.

The shaft 12 can also be formed from a solid metal bar, as shown in FIG. 6, that is round, square or other appropriate shape. The slot 18 is machined into the metal bar and the end surfaces 20 and 22 are formed by the cutter that forms the slot. The high friction grip surface is a knurled surface 26 that could be a sleeve that slides over the free end 24 or could be formed directly on the shaft 12. The metal bar which is machined to form the shaft 12 is preferably stainless steel.

A shaft 12 machined from a solid stainless steel bar is the preferred construction. Such a shaft 12 has excellent strength and durability and requires minimum maintenance. Cleaning with soap and water and a brush is the normal maintenance. However, such construction is relatively expensive due to the required machining of stainless steel. The fabricated construction shaft 12, with a U shaped member formed from a flat bar or with two bars and spacers as described above, would be less expensive to manufacture. Shafts 12 with each of the three constructions described above function the same.

The blade 14 is formed from a flat steel plate. Stainless steel is preferred to eliminate corrosion and reduce maintenance but other steel products would be acceptable. The blade member 14 has a thickness that is slightly less than the width of the slot 18 and the shaft 12. The first end 34 of the blade member 14 is positioned in the end of the slot 18 that is furthest from the free end 24 of the shaft 12. A pivot pin 16 passes through the shaft 12 and the first end 34 of the blade member 14 to pivotally secure the blade member to the shaft.

Beveled surfaces 36 and 38 are ground into a portion of the blade member 14 to form a first cutting edge 40, a second cutting edge 42 and a third cutting edge 44. These cutting edges are all in a common plane that is transverse to the pivot pin 16 pivot axis. The first cutting edge 40 and the third cutting edge 44 are in a common plane that is parallel to the pivot axis of the pivot pin 16. The second cutting edge 42 is offset from the first cutting edge 40 and the third cutting edge 44 toward the shaft 12. The second cutting edge 42 is joined to the first and third cutting edges 40 and 44 by angled transition cutting edges 46 and 48. The first cutting edge 40 is substantially shorter than the third cutting edge 44. As shown in FIG. 2, the third cutting edge 44 is longer than the first and second cutting edges 40 and 42 combined. This arrangement places the second cutting edge 42 relatively close to the pivot pin 16.

The cutting edges 40, 42, 44, 46, and 48 are similar to the cutting edge on a chisel. They are relatively blunt compared to a knife edge for example. Relatively blunt chisel type cutting edges are stronger and less likely to be damaged than a knife edge when cutting bones or other relatively hard objects.

A hand grip 50 is secured to the second end 52 of the blade member 14 by fasteners 54 and 56. These fasteners can be rivets, bolts or similar mechanical structures. The second end 52 of the blade member 14 is connected to the first end 34 by an integral angled section 58 that offsets the hand grip 50 from the shaft 12. The offset of the hand grip 50 from the shaft 12 provides space for a hunter to grasp the hand grip 50 and the shaft 12 when the blade member 14 is in a closed position.

The blade member 14 is shown in a closed position in phantom lines in FIG. 1. When the blade member 14 is in the closed position, the cutting edges 40, 42, 44, 46, and 48 are within the slot 18 and contact between the angled section 58 of the blade member 14 and the end surface 22 of the slot prevent further pivotal movement of the blade member 14 about the axis of the pivot pin 16 in a clockwise direction as shown in FIG. 2. The blade member 14 can be pivoted in a counterclockwise direction about 90 degrees until the stop surface 60 on the blade member 14 contacts the shaft 12 at an end of the slot 18.

During use, the shaft 12 is positioned in the abdominal cavity 62 of the animal with the blade member 14 in an open position. The free end 24 of the shaft 12 is then inserted under the pelvic girdle 64 and moved to the rear until the free end extends through an aperture 66 and the hide 68 near the animal's anus. The aperture 66 can be formed with a knife or the free end 24 of the shaft 12 can be forced through the hide 68.

The blade member 14 is then moved toward a closed position relative to the shaft 12. The second cutting edge 42 makes contact with the pelvic girdle 64 and upon further movement toward the shaft 12, cooperates with the anvil surfaces 28 and 30 to split the pelvic girdle. The location of the second cutting edge 42 close to the pivot pin 16 provides a substantial mechanical advantage that allows a hunter to sever the pelvic girdle 64 manually without relying upon impact from a rock or other heavy object. The angled transition cutting edge 46 cooperates with the second cutting edge 42 to keep the splitter 10 from sliding relative to the pelvic girdle 64. Continued pivotal movement of the blade member 14 towards the closed position permits the third cutting edge 44 to cooperate with the anvil surfaces 28 and 30 to sever portions of the carcass if any that prevent exposure of the terminal end of the small intestine.

While preferred embodiments and methods of the invention have been shown and described, other embodiments will now become apparent to those skilled in the art. Accordingly, the invention is not to be limited to that which is shown and described but by the following claims.

I claim:

1. A pelvic bone splitter comprising a shaft with an elongated slot, an anvil surface on each side of the slot and a gripping surface on a free end of the shaft; and a blade member with a first end pivotally attached to the shaft, a hand grip on a second end and a cutting edge between the hand grip and the first end and wherein the cutting edge is received in the slot in the shaft upon pivotal movement of the blade member in a close direction relative to the shaft, the cutting edge cooperates with the anvil surfaces to split a traversing bone upon pivotal movement of the cutting edge in the close direction towards the slot, and the cutting edge is removed from the slot in the shaft upon pivotal movement of the blade member in an open direction relative to the shaft.

2. A pelvic bone splitter as set forth in claim 1 wherein the slot in the shaft is formed by removing material from a solid bar.

3. A pelvic bone splitter as set forth in claim 1 wherein the gripping surface on the free end of the shaft is a knurled surface.

4. A pelvic bone splitter as set forth in claim 2 wherein the gripping surface on the free end of the shaft is a knurled surface.

5. A pelvic bone splitter as set forth in claim 1 wherein the cutting edge is at the junction of two beveled surfaces.

6. A pelvic bone splitter as set forth in claim 5 wherein the cutting edge is in a plane perpendicular to an axis of rotation of the blade member relative to the shaft.

7. A pelvic bone splitter as set forth in claim 1 wherein the cutting edge includes a first cutting edge portion adjacent to the first end of the blade member, a third cutting portion adjacent to the handgrip and a second cutting edge portion between the first and third cutting edge portions and offset from the first and third cutting edge portions toward the slot.

8. A pelvic bone splitter comprising a shaft with a slot, an anvil surface on each side of the slot and a gripping surface on a free end of the shaft; and a blade member with a first end pivotally attached to the shaft, a hand grip on a second end and a cutting edge between the hand grip and the first end and wherein the cutting edge includes a first cutting edge portion adjacent to the first end of the blade member, a third cutting edge portion adjacent to the handgrip and a second cutting edge portion between the first and third cutting edge portions and offset from the first and third cutting edge portions toward the slot and wherein the cutting edge is received in the slot in the shaft upon pivotal movement of the blade member in a close direction relative to the shaft, the cutting edge cooperates with the anvil surfaces to split bone upon pivotal movement of the cutting edge in the close direction towards the slot, the cutting edge is removed from the slot in the shaft upon pivotal movement of the blade member in an open direction relative to the shaft, and wherein the first and third cutting edge portions are in a common plane parallel to an axis of rotation of the blade member relative to the shaft.

9. A pelvic bone splitter comprising a shaft with a slot, an anvil surface on each side of the slot and a gripping surface on a free end of the shaft; and a blade member with a first end pivotally attached to the shaft, a hand grip on a second end and a cutting edge between the hand grip and the first end and wherein the cutting edge includes a first cutting edge portion adjacent to the first end of the blade member, a third cutting edge portion adjacent to the handgrip and a second cutting edge portion between the first and third cutting edge portions and offset from the first and third cutting edge portions toward the slot, and wherein the cutting edge is received in the slot in the shaft upon pivotal movement of the blade member in a close direction relative to the shaft, the cutting edge cooperates with the anvil surfaces to split bone upon pivotal movement of the cutting edge in the close direction towards the slot, the cutting edge is removed from the slot in the shaft upon pivotal movement of the blade member in an open direction relative to the shaft, and wherein the first and second cutting edge portions are joined by a first angled transition cutting edge and the second and third cutting edges are joined by a second angled transition cutting edge.

10. A pelvic bone splitter as set forth in claim 8 wherein the first and second cutting edge portions are joined by a first angled transition cutting edge and the second and third cutting edges are joined by a second transition cutting edge.

11. A method of severing a pelvic girdle of an animal with a pelvic bone splitter having a shaft with a slot, an anvil surface on each side of the slot, a gripping surface on a free end of the shaft, a blade member with a first end pivotally attached to the shaft, a hand grip on a second end of the blade member, a cutting edge between the hand grip and the first end of the blade member that is movable into and out of the slot in the shaft upon pivotal movement of the blade member relative to the shaft comprising:

a. pivoting the cutting edge of the blade member out of the slot, b. placing the shaft in the open body cavity of an animal with the free end of the shaft adjacent to the pelvic girdle, c. advancing the shaft between the pelvic girdle and an animal's backbone and through an opening adjacent to the animal's anus, d. pivoting the cutting edge of the blade member toward the slot in the shaft and compressing the pelvic girdle between the anvil surfaces on the shaft and the cutting edge on the blade member, and e. apply sufficient force to the handle of the blade member to split the pelvic girdle and move the cutting edge into the slot.

12. A method of severing a pelvic girdle as set forth in claim 11 including continuing pivotal movement of the cutting edge of the blade member into the slot in the shaft after the pelvic girdle is split to sever other carcus material that partially covers a portion of an animal's small intestine.

* * * * *